United States Patent Office 2,820,474
Patented Jan. 21, 1958

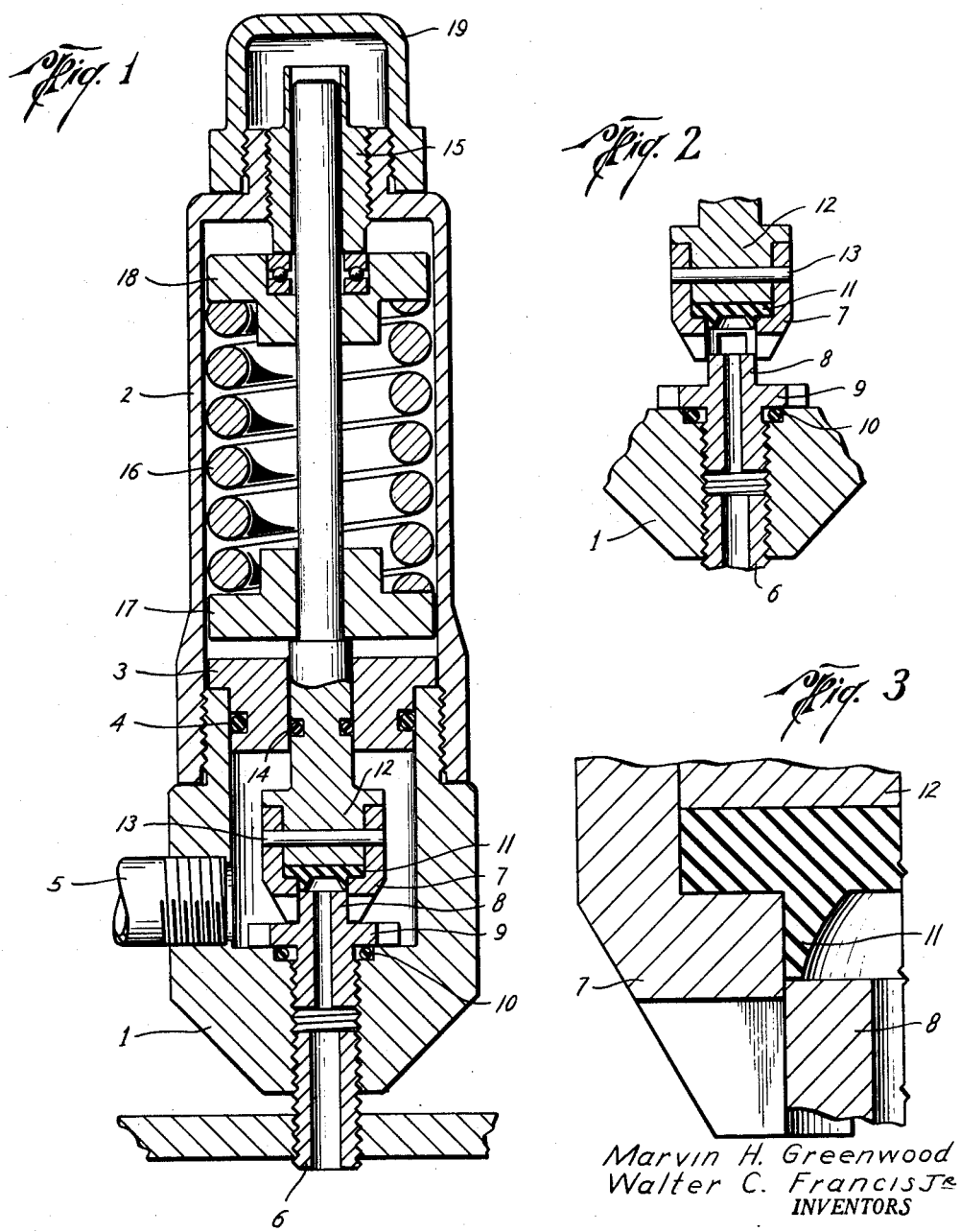

2,820,474

RELIEF VALVE WITH HIGH-PRESSURE SEAL

Marvin H. Greenwood and Walter C. Francis, Jr., Houston, Tex., assignors to Anderson, Greenwood & Company, Bellaire, Tex., a corporation of Texas Application September 10, 1954, Serial No. 455,184

6 Claims. (Cl. 137—536)

This invention relates to an improved valve structure, and more particularly to a closure especially adapted to control flow of fluid under high pressures. The higher the fluid pressure, the more difficult it is to seal against leakage, and the more important is the need to seal. The problems are acute in fluid flow control valves, including pressure relief valves intended for automatic operation to avoid excess pressure, either as a safety factor or for the maintenance of line pressures at predetermined levels. An ideal valve would be one which is thoroughly reliable to seal and maintain the seal indefinitely when closed and to break the seal quickly when opened, and in the case of a pressure relief valve, to operate each time at precisely the preselected critical pressure level. It should also be simple in construction and capable of being easily manufactured at low cost. To accomplish these aims is one of the objects of the present invention.

A further object of the invention is to provide a valve structure which utilizes pressure of the controlled fluid to insure an effective seal and whose effectiveness tends to increase as the fluid pressure rises within practical limits for which a particular valve may have been designed.

Another object of the invention is to provide a valve and valve seat arrangement in which the seal is constituted of a relatively soft, elastic, deformable material shaped to make initially tight contact with its associated bearing surface and to be protectively controlled under deforming pressure of the fluid to which a portion of its area is exposed for increased tightness but which separates or breaks the sealing contact easily when the valve is lifted away from the seat without harmful distortion or pinching of the soft sealing material. The fit of the seal to its associated parts is of important consequence, and the shape referred to includes the formation of the seal with an annular wall of tapered cross section whose thickness diminishes toward its seat engaging end to present a thin annular contact face approximating a featheredge line bearing for a concentrated loading over a small area and which loading increases as the deformable material tends to flow axially under radially directed fluid pressure applied against the internal wall surface of the annular ring.

Other objects and advantages will become apparent during the course of the following specification having reference to the accompanying drawing, wherein Figure 1 is a vertical, longitudinal, sectional view of a pressure relief valve in closed position; Fig. 2 is a fragmentary sectional view at the valve seat and with the valve in fully opened position; and Fig. 3 is an enlarged sectional fragment of the sealing parts in closed position.

The blowoff valve illustrated is well adapted for high precision manufacture, and can be produced in different sizes suitable for maintaining pressures at selected levels within a wide range from a few hundred to as much as twenty-five thousand pounds per square inch. The valve seating spring preferably should be of high quality spring steel, and the remaining parts of the assembly, except for the deformable valve insert, may be of stainless steel, although other materials may be employed as a matter of choice.

The operating parts are completely encased within a protective housing comprising a pair of hollow cup members 1 and 2 detachably screw threaded together at adjacent ends and in which is fitted a partition plug 3 separating the casing interior into an inner valve chamber and an outer spring chamber, which latter is to be packed with a lubricating grease. A peripheral groove in the plug 3 receives an O-ring or other suitable packing 4 to bear on the casing wall and seal the tandem chambers from one another. Inlet and outlet passages to and from the valve chamber are provided in the innermost casing cup 1. The inlet port is shown as an axially disposed, internally threaded opening through the base of the cup, and the outlet is a lateral port in the side wall, and which preferably is also internally threaded for reception optionally of the end of an overflow or vent tube 5 leading to a suitable discharge point. The axially disposed inlet port enables connection by a coupling nipple 6 with a conduit or holder containing fluid whose pressure level is to be controlled.

For controlling flow from the inlet to the outlet, there are contained within the valve chamber a pair of tubular concentrically nested and telescopic parts 7 and 8 slidably sleeved one on the other. The innermost valve part 8 is constituted by an upstanding boss on a fitting fixedly threaded into the inlet port to the limit afforded by an intermediate flange 9 abutting the upper face of the bottom or base of the valve chamber and compressing an O-ring packing 10 positioned in a countersunk recess surrounding the inlet port to resist leakage of pressure fluid in by-passing relation to the valve. Flow of pressure fluid toward the valve chamber is through the hollow fitting 8, whose bore may be of preselected size to serve as a metering orifice for a sustained velocity flow against the underside of the valve in its wide-open dump position. The flow passages from the valve seat are larger than is the orifice opening for a quick emission and pressure reduction beyond the valve, but a high velocity flow to the valve will give better control of valve response and tend to reduce flutter.

As viewed in the drawings, the boss 8 terminates at its upper end in a flat annular valve seat or shoulder for co-operation with the lower end face of a sealing insert 11 of elastic, deformable material such as synthetic rubber or plastic, of which Teflon is an example. At its opposite end the insert 11 seats or bottoms against a shoulder afforded by the underside of a projectable-retractable valve head 12 and is retained in place by the previously mentioned outer valve part 7, which is a hollow cap whose reduced diameter lower end portion receives and is slidable on the tubular valve boss 8 and whose larger diameter upper end portion is sleeved on and secured to the valve head 12 by a transverse pin 13 press fitted in aligned apertures of the interfitted parts.

An upstanding stem on the valve head 12 has an intermediate shoulder or stop between a lower, larger diameter portion slidably guided in the partition 3 with the bearing surfaces sealed by the O-ring packing 14 and an upper, smaller diameter portion slidably guided in a hollow screw stud 15 adjustably threaded in the upper end wall of the casing cup 2. Yieldable force for seating the valve is provided by a coil spring 16 housed within the lubricant filled chamber to bear at one end on a washer 17 seated on the intermediate shoulder of the valve stem and to bear at the opposite end on a bottoming washer 18 which pockets an antifriction or ball-bearing assembly to abut the lower end of the adjustable screw stud 15. Spring torsion incident to compression and expansion is relieved by the rotary bearing. Spring strength is selected according to the valve opening pressure desired, and adjustment through the screw stud 15 enables calibration of force exerted by the spring. A protective hood 19 is removably secured to the casing in enclosing relation to the upper end of the adjustment stud.

Under the yieldable force of the coil spring 16, the movable valve is projected downwardly to the stop limit afforded by abutment of the lower end of the cap 7 with the top face of the bottoming flange 9. In the valve closed position, the axial space between the opposed faces at the top of the valve seating boss 8 and at the bottom of the valve head 12 is of slightly less dimension than the initial unstressed axial length of the deformable insert 11, and this will insure a seating relation without substantial axial compression stress. For convenience, the insert 11 is molded or otherwise shaped as an interiorly domed disk whose upper surface is flat to fit against the underside of the valve head 12 and whose outside diameter corresponds to that of the valve head. Its thickness immediately below the top surface is such as to form an annular flange to fill the space between the valve head underside and the upper face of the base of the cap 7, and it will be noted more particularly that the disk has a dependent skirt or annular lip whose outside diameter corresponds to the inside diameter of the opening through the base of the cap 7. The inside wall surface of the cap in this region affords a continuous and uninterrupted backing for the periphery of the skirt, both circumferentially and axially, and the axial length of the cap wall, as best seen in Fig. 3, is greater than the length of the skirt and extends below the plane of the upper face of the valve seat 8 when the parts are in closed position. The overextension of the solid wall backing should be at least as great as the maximum axial distention of the skirt, as may occur, for example, in the instant when the valve is moved under fluid pressure away from the fixed seat and before the pressure is dumped through the openings milled upwardly from the bottom of the annular wall of the cap 7 slidably fitted to the upstanding valve seat 8. In this initial upward travel, the pressure fluid is still acting on the internal face of the annular skirt, so that there will be a tendency toward axial flow of the soft material, but the flow will be less than will reach the end of the wall bearing and will not be subject to harmful pinching and distortion drag as the fluid pressure rushes past at high velocity upon further lifting of the valve above the seat.

An important characteristic of the deformable sealing skirt is that in transverse cross section its wall thickness decreases or tapers downwardly for an approximate featheredge effect, so that its lower seating end presents a narrow annular line contacting area. Such line contact of the seal ring reduces breakaway resistance for a quick opening of the valve and also localizes in a concentrated area the axial force upon closing contact. With the valve in closed position, the full internal pressure of the fluid acts on the inside face of the deformable insert for transmitting the force to the valve head in bucking opposition to the closing spring, but the resistance offered by the solid backing squeezes the deformable material and tends to flow or crowd it, and the least resistance is toward the thinning wall at the valve joint surfaces. The radially, outwardly acting fluid pressure on the deformable skirt will tend to displace the skirt material axially and crowd the material, not only to increase the bulk at the line of contact but to stiffen the material and make a more firm contact at the sealing region. The conformation of the sealing skirt to the forces thereon is generally illustrated in Fig. 3.

For a fifty-five hundred pounds per square inch pressure relief valve, appropriate dimensions for the elastic skirt could, by way of illustration, be on the order of a length of .093–.095″, with an angle between the tapered faces of 30° and a thickness at the narrow end face of .010–.015″.

While the foregoing specification deals with the detail structure of but a single embodiment, it will be understood that the invention may be variously applied and that modifications may be made as come within the scope of the appended claims.

What is claimed is:

1. A pressure relief valve including a casing, a partition dividing the casing into a valve chamber having an inlet and an outlet and a spring chamber to sealably contain a lubricant, an adjustable spring housed within the spring chamber, a valve stem slidable in said partition and engaged by the spring for yieldable projection of the stem, a head on the stem in the valve chamber, a retainer cap secured to the stem and engageable with the casing to limit spring projection, a boss fixed to the casing for slidable reception within said cap and terminated in an annular valve seat which is spaced in fixed relation from said head at the limit of spring projection, said boss having a restricted flow orifice passage therefrom forming a part of said inlet and extending normal to the underside of said head and being of a size as to increase fluid flow velocity and the force of flow impingement on the underside of said head when the valve is unseated and an elastic, deformable skirt fixedly anchored at its outer edge by said retainer between the valve seat and said head and whose axial length slightly exceeds the space between the head and the seat when the valve is unseated and makes sealing contact at its inner edge with the seat in advance of cap engagement with the casing under spring projection, said skirt having a wall thickness which diminishes toward a featheredge relation at the seat and the material of the skirt responding to fluid pressure thereon to flow axially toward and increase skirt wall thickness at said featheredge sealing contact with the seat in valve closed position.

2. In a pressure relief valve, a casing having a valve chamber and a spring chamber, a valve seat in the valve chamber, a valve stem carrying an elastic, deformable ring which throughout its length is of tapered wall thickness decreasing to a featheredge engageable with said seat, co-operating seat abutments on the casing and the valve stem engageable to limit relative travel of said deformable ring and the valve seat toward one another and thereby substantially free said featheredge of axial stress in the valve closed fit of the parts, an external backing for said wall throughout its length and which backing extends axially beyond said featheredge as a solid resistance to radial extrusion, said wall when the valve is closed presenting its interior surface to be acted on by pressure fluid to be controlled and being axially distensible under fluid pressure acting radially thereon to crowd and displace the skirt material from thicker to thinner wall regions, a partition separating said chambers and slidably guiding said valve stem, and a valve seating spring in the spring chamber active on said stem.

3. In a pressure sealing valve, a pair of concentrically nested tubular elements slidably sleeved one on the other for relative movement to and from valve closing position, complementary annular shoulders carried by said elements in opposed facing relation, abutment stops to limit sliding travel of said elements toward closing position and thereby define a predetermined minimum axial spacing between said shoulders, an elastic, deformable ring fixedly anchored against bodily movement in the space between said shoulders and restrained against radial expansion by bearing contact throughout the ring peripheral area with the interior wall surface of one of said elements, said wall surface being longer axially than and extended beyond the initial unstressed length of the ring and at least as long as the maximum length of the ring under axial elongation deformation due to pressure fluid controlled by the valve and said unstressed length of the ring being slightly in excess of said predetermined spacing to insure seating of the ring ends with said shoulders, the annular wall of said ring being tapered axially throughout its length toward the shoulder of the other of said elements to a wall thickness approximating a feather line edge for a narrow line initial seating on the last mentioned shoulder, the deformation resistance of said ring being less than the pressure of the fluid to be valved for axial flow of the material of the tapered ring from its thicker wall portion toward its tapered featheredge to stiffen and thicken the body of the thinner wall portion adjacent said edge when said limit stops are in abutment and said tapered wall is squeezed radially between the aforesaid interior wall surface and the pressure fluid, said extended wall surface serving to radially confine and prevent extrusion of the featheredge end of the ring when it is moved away from its shoulder for passing pressure fluid.

4. In a pressure sealing valve, an inner member terminating in a valve seat having a velocity increasing restricted passage therethrough, a casing containing said seat, a projectable-retractable valve stem mounted in the casing with a valve head co-operating with the seat and overlying said passage for impact on the head by outgoing pressure fluid for an antiflutter effect, an elastic, deformable insert interposed between said head and said seat and including an annular skirt whose transverse wall dimension throughout its length decreases toward the seat and whose interior surface is arranged for exposure to pressure fluid from said passage for the axial flow of wall material from its thicker region toward its thinner region adjacent the seat, a cap sleeved at one end on said head and fixed thereto and slidably guided at the other end on said inner member and embracing in an intermediate region said skirt to retain the same on the head and against radial expansion, and means to limit the extent of projection of said valve stem in relation to the contact of said skirt with the valve seat.

5. In a pressure sealing valve, inner and outer members telescopically sleeved one on the other and one thereof having an annular valve seat, an elastic, deformable ring peripherally fitted to the interior wall surface of the other member to confine radial expansion of the ring and of tapered wall thickness throughout its length feathering toward annular line contact with said valve seat when the members are moved toward one another, and means to limit further relative movement of the members toward one another after an initial contact of the narrow edge of the tapered ring with its seat and thereby restrict axial compression force on the ring, said ring having the interior face of its tapered wall exposed to pressure of fluid sealed off upon contact with the seat of the narrow edge of the tapered ring for a pressure stiffening of the thin edge portion by axial flow of material of the tapered ring from its thicker portion to its thinner portion at the line of contact.

6. In a control valve assembly having automatic response to fluid pressure to be valved from its high pressure side to its low pressure side, an outer sleeve member and an inner piston member telescopically slidable one on the other, co-operating stop abutments on said members limiting their relative travel inwardly to valve closing position, biasing means yieldably opposing abutment separation, said piston member having a restricted pressure flow orifice therein operative to increase open valve flow velocity therethrough and terminating in an outwardly facing flat valve seat of an area greater than that of the restricted orifice therethrough, said sleeve member having an outflow passage through a region of the sleeve wall which overlaps the piston member in valve closed position and opens beyond said valve seat upon separation of said abutments and has an outflow area greater than said orifice, a domed surface internally of the sleeve member in opposing relation to said flat valve face for co-operation with the face in forming an enlarged pressure fluid entrapping chamber having a roof area exposed to chamber entrapped pressure fluid, of a size exceeding the area of the orifice through which pressure in the chamber and the pressure of the fluid to be controlled are equalized when said abutments are engaged, the roof of said chamber directly overlying said restricted orifice being subject to velocity impact of pressure flow through the restricted orifice when said outflow passage is open above said flat valve seat, a valve sealing skirt of deformable material anchored internally of the sleeve member in snug lining fit to the inner surface of the sleeve wall and annularly bounding said chamber, with the skirt wall inner surface inclined downwardly for a diminishing wall thickness to a thin edge ending in advance of said outflow passage through the sleeve wall and making narrow line contact with said flat face when said abutments are seated to minimize sticking and promote ready breakaway upon abutment separation, said skirt material responding to fluid pressure equalized through said restricted orifice and within the enlarged chamber for axial flow of the skirt material and compacting thereof at its thin edge on said flat face, said greater area of the outflow passage serving to remove back pressure resistance to outrushing flow through the restricted orifice to an extent that once chamber pressure overcomes said biasing means and opens the chamber, then thereafter the impact on said domed surface and the inertia force of outrushing flow whose velocity is multiplied through the restricted orifice, affords added resistance to said biasing means in compensation for the sudden pressure drop in said chamber for minimizing valve flutter.

References Cited in the file of this patent

UNITED STATES PATENTS

| | | |
|---|---|---|
| 1,000,799 | Grimes | Aug. 15, 1911 |
| 2,505,613 | Farris | Apr. 25, 1950 |
| 2,522,913 | Westman | Sept. 19, 1950 |
| 2,568,026 | Pigott | Sept. 18, 1951 |
| 2,593,740 | Faust | Apr. 22, 1952 |
| 2,595,012 | Smith | Apr. 29, 1952 |
| 2,610,021 | Smith | Sept. 9, 1952 |